United States Patent
Feng et al.

(10) Patent No.: US 9,071,147 B2
(45) Date of Patent: Jun. 30, 2015

(54) AVERAGE INPUT CURRENT ESTIMATION BASED ON PRIMARY SIDE CURRENT SENSE

(71) Applicant: iWatt Inc., Campbell, CA (US)

(72) Inventors: Guang Feng, Cupertino, CA (US);
Xiaoyan Wang, Milpitas, CA (US);
Liang Yan, Milpitas, CA (US);
Chuanyang Wang, San Jose, CA (US);
Clarita Poon, Pleasanton, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 150 days.

(21) Appl. No.: 13/770,953

(22) Filed: Feb. 19, 2013

(65) Prior Publication Data
US 2014/0233269 A1   Aug. 21, 2014

(51) Int. Cl.
*H02M 3/335*  (2006.01)
(52) U.S. Cl.
CPC ................... *H02M 3/335* (2013.01)

(58) Field of Classification Search
USPC .......... 363/21.04, 21.05, 21.07, 21.08, 21.09, 363/21.12, 21.13, 21.15, 21.16, 21.17
See application file for complete search history.

(56) References Cited

U.S. PATENT DOCUMENTS

| | | | |
|---|---|---|---|
| 6,999,015 B2 * | 2/2006 | Zhang et al. | 341/144 |
| 2005/0237041 A1 * | 10/2005 | Weng | 323/282 |
| 2010/0124084 A1 * | 5/2010 | Chang et al. | 363/95 |
| 2010/0208500 A1 * | 8/2010 | Yan et al. | 363/21.12 |
| 2010/0320922 A1 * | 12/2010 | Palazzolo et al. | 315/210 |
| 2011/0286248 A1 * | 11/2011 | Wang et al. | 363/21.18 |
| 2012/0049753 A1 * | 3/2012 | Hwang et al. | 315/224 |

* cited by examiner

*Primary Examiner* — Jeffrey Gblende
(74) *Attorney, Agent, or Firm* — Fenwick & West LLP

(57) ABSTRACT

The embodiments herein describe a power converter including a controller that estimates input current of the power converter. The controller estimates the input current without explicitly sensing the input current. The estimated input current can be used in various applications such as regulating power factor and total harmonic distortion as well as estimating current required to maintain proper operation of a dimmer switch in light emitting diode lamp systems.

13 Claims, 4 Drawing Sheets

… (US 9,071,147 B2)

AVERAGE INPUT CURRENT ESTIMATION BASED ON PRIMARY SIDE CURRENT SENSE

BACKGROUND

1. Field of Technology

Embodiments disclosed herein relate generally to switching power converters, and more specifically, to techniques for estimating input current indirectly from the peak value of the primary side current of switching power converters.

2. Description of the Related Arts

In switching power converters, the input current is often sensed and/or controlled to provide high power factor. Power factor in switching power converters is defined as the ratio of the real power delivered to the load to the apparent power provided by the power source. Utility companies or government agencies require power factors in switching power converters to exceed a certain minimum level by regulation. Thus, switching power converters should deliver power from the power source to the load with a high power factor and low total harmonic distortion. To achieve high power factor and low total harmonic distortion, the input current of a power converter is regulated to follow the input voltage as closely as possible.

Furthermore, the input current is often sensed and/or controlled to ensure correct operation of dimmer switches in light emitting diode (LED) lamp system applications. LED lamp systems generally include a LED lamp used with a dimmer switch. Conventional dimmer switches adjust lamp input voltage using a TRIAC circuit. A TRIAC is a bidirectional device that conducts current in either direction when it is triggered (i.e., turned on). Once triggered, the TRIAC continues to conduct until the current drops below a certain threshold, called a holding current threshold. For the internal timing of a TRIAC dimmer to function properly, a minimum input current must be maintained in order to keep the dimmer on. Thus, the input current of the power supply needs to be sensed in order for a controller of the power supply to control the power supply to provide enough current to the dimmer to keep the dimmer on while minimizing power loss through the power supply.

In conventional power converters, the input current is sensed directly by a sensing resistor or a current sense transformer. However, the direct measurement of the input current requires extra components which increase the system bill of material cost as well as the size of the system. Also, directly sensing the input current causes additional power loses through the components used to directly sense the input current.

SUMMARY

The embodiments herein disclose a method of a power controller for estimating average input current of a switched mode power converter. The power controller may estimate the average input current without directly sensing the input current thereby reducing the system bill of material costs, size of the system, and power loses. In one embodiment, the power controller calculates an estimation of the average input current of the power converter based on a value representing a target peak primary side current of the power converter and an impedance of a sense resistor for sensing the primary side current of the power controller.

In one embodiment, the controller determines the impedance of the sense resistor in the power converter. During a measurement mode of the controller, the controller supplies a constant current to a pin of the controller that is used to sense the primary side current of the power converter. The controller measures the voltage drop across a voltage divider. In one embodiment, the voltage divider includes the sense resistor and an additional resistor for measuring the impedance of the sense resistor.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Figure 1:
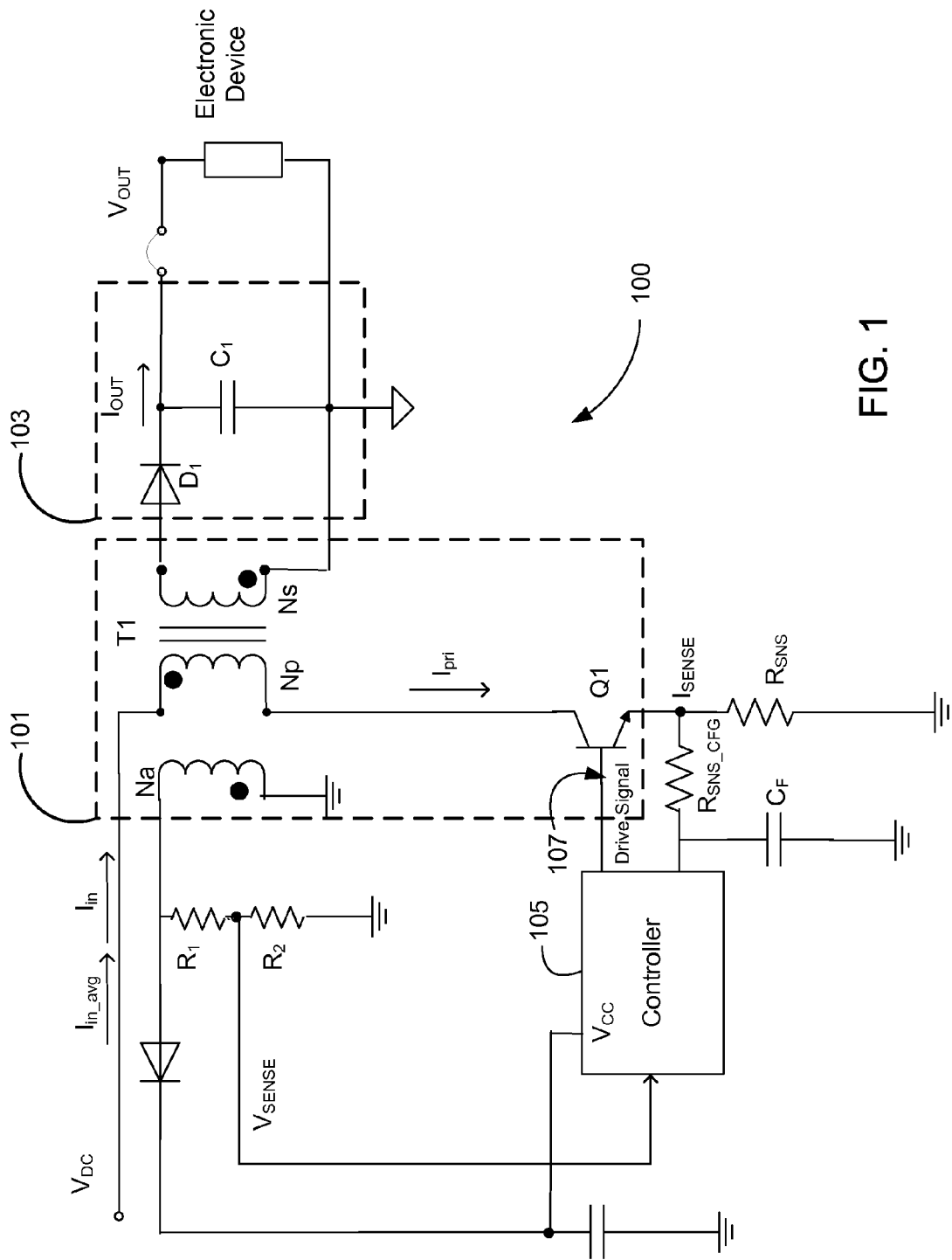
FIG. 1 is a circuit diagram of a switching power converter according to one embodiment.

FIG. 1 is a circuit diagram of a flyback type switching power converter 100 that uses a switch Q1. In one embodiment, the switch Q1 is a bipolar junction transistor (BJT) as shown in FIG. 1. However, the switch Q1 may be any type of switching device such as a metal-oxide-semiconductor field-effect transistor (MOSFET). The switching power converter 100 includes a power stage 101 and a secondary output stage 103. Power stage 101 includes the switch Q1 and a power transformer T1. Power transformer T1 includes primary winding Np, secondary winding Ns, and auxiliary winding Na. Secondary output stage 103 includes diode $D_1$ and output capacitor $C_1$. A controller 105 controls the ON state and the OFF state of switch Q1 using output drive signal 107 in the form of a pulse with on-times ($T_{ON}$) and off-times ($T_{OFF}$). That is, the controller 105 generates the output drive signal 107 that drives the switch Q1.

AC power is received from an AC power source (not shown) and is rectified to provide the unregulated input voltage $V_{DC}$. The input power is stored in transformer T1 while the switch Q1 is turned on, because the diode $D_1$ becomes reverse biased when the switch Q1 is turned on. The rectified input power is then transferred to an electronic device across the capacitor $C_1$ while the switch Q1 is turned off, because the diode $D_1$ becomes forward biased when the switch Q1 is turned off. Diode $D_1$ functions as an output rectifier and capacitor $C_1$ functions as an output filter. The resulting regulated output voltage $V_{OUT}$ is delivered to the electronic device.

As mentioned previously, the controller 105 generates appropriate switch drive pulses 107 to control the on-times and off-times of switch Q1 and regulate the output voltage $V_{OUT}$. The controller 105 controls switch Q1 using a feedback loop based on the sensed output voltage $V_{SENSE}$ and the sensed primary side current $I_{pri}$ in previous switching cycles of the switching power converter to generate the timings to turn on or off the switch Q1 in subsequent switching cycles, in a variety of operation modes including PWM (pulse width modulation) and/or PFM (pulse frequency modulation) modes. $I_{SENSE}$ is the voltage across resistor $R_{SNS}$ and is used by the controller 105 to sense the primary current $I_{pri}$ through the primary winding Np and switch Q1 in the form of a voltage across the sense resistor $R_{SNS}$ and ground. Capacitor $C_F$ filters noise from the $I_{SENSE}$ signal.

The output voltage $V_{OUT}$ is reflected across auxiliary winding Na of transformer T1, which is input to controller 105 as the voltage $V_{SENSE}$ via a resistive voltage divider comprised of resistors $R_1$ and $R_2$. Based on the sensed output voltage, the controller 105 determines the times at which the switch Q1 is turned on in PFM, PWM, or any other regulation mode employed by the controller 105.

Primary Side Current Regulation

Figure 2:
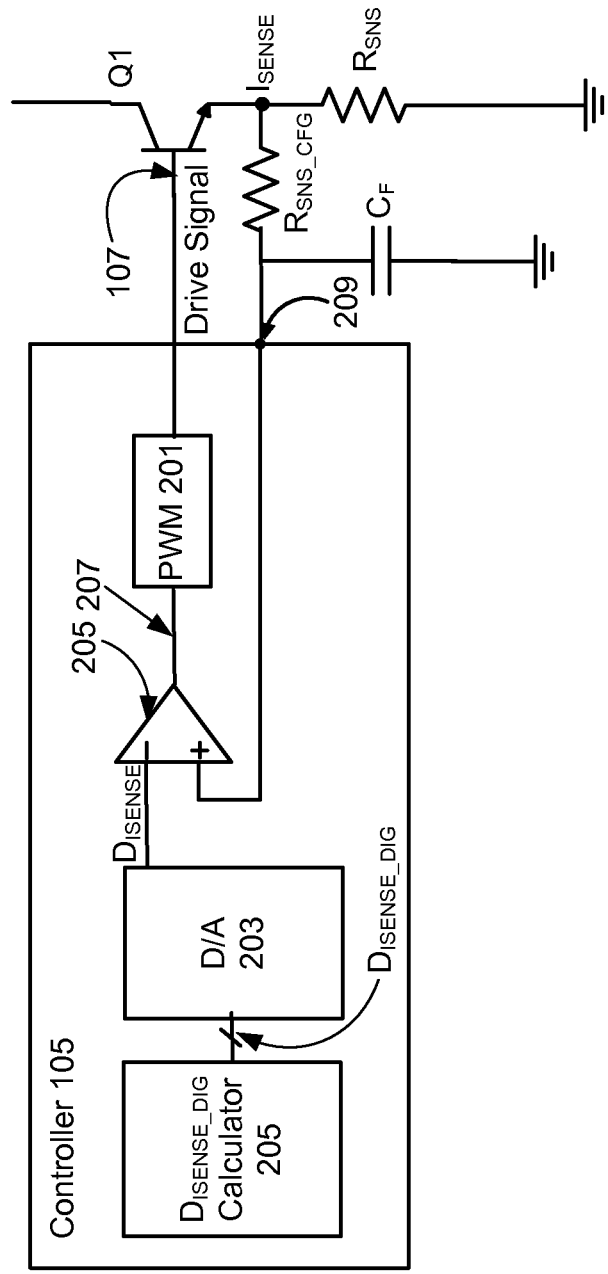
FIG. 2 is a circuit diagram of a controller of the switching power converter according to one embodiment.

FIG. 2 is a circuit diagram of the controller 105 for primary side current regulation of the power converter 100 according to one embodiment. As shown in FIG. 2, the controller 105 includes a $D_{ISENSE\_DIG}$ calculator 205. The $D_{ISENSE\_DIG}$ calculator 205 calculates a reference regulation voltage $D_{ISENSE\_DIG}$ that is a digital representation of a reference regulation voltage $D_{ISENSE}$ (i.e., a value) corresponding to a target peak primary side current $I_{pri\_pk\_target}$ of the power converter 100 shown in FIG. 3. In one embodiment, the $D_{ISENSE\_DIG}$ calculator 205 calculates the value of $D_{ISENSE\_DIG}$ based on feedback signals $V_{DC}$, $V_{SENSE}$, and $I_{SENSE}$ that results in a target output current corresponding to the target peak primary side current $I_{pri\_pk\_target}$ of the power converter 100. The $D_{ISENSE\_DIG}$ calculator 205 outputs the reference regulation voltage $D_{ISENSE\_DIG}$ to a digital-to-analog (D/A) converter 203. The D/A converter 203 converts the reference regulation voltage $D_{ISENSE\_DIG}$ to an analog signal, i.e., the reference voltage $D_{ISENSE}$.

During each switching cycle of the power converter 100, a comparator 205 determines if the sensed primary side current $I_{pri}$ has reached the target peak primary side current $I_{pri\_pk\_target}$ represented by the reference regulation voltage $D_{ISENSE}$. To determine whether the target peak primary side current $I_{pri\_pk\_target}$ is reached during each switching cycle of the power converter 100, the comparator 205 compares the voltage $I_{SENSE}$ sensed via the $I_{SENSE}$ pin 209 of the controller 105 with the reference regulation voltage $D_{ISENSE}$.

When the sensed primary peak current $I_{pri\_pk}$ represented by $I_{SENSE}$ exceeds the reference regulation voltage $D_{ISENSE}$ during each switching cycle, the comparator 205 generates a signal 207 that is sent to the PWM unit 201, indicating that peak primary side current $I_{pri\_pk}$ has reached the target peak primary side current $I_{pri\_pk\_target}$. In response to the signal 207, the PWM unit 201 generates a switch drive signal 107 to turn off the switch Q1 because the target peak primary side $I_{pri\_pk\_target}$ current is reached.

Average Input Current Estimation

In one embodiment, the controller 105 estimates the average input current $I_{in\_avg}$ of the power converter 100 without explicitly sensing the input current $I_{in}$ with a current sense component. Based on the estimated average input current $I_{in\_avg}$, the controller 105 performs various functions depending on the particular application. For example, the controller 105 may regulate power factor and total harmonic distortion by regulating the input current to follow the input voltage. The controller 105 may also estimate any additional bleeding current required to maintain operation of a dimmer switch in a LED lamp system based on the estimated average input current $I_{in\_avg}$. The bleeding current describes additional current required for the dimmer switch of the LED lamp system to operate properly if the primary side current $I_{pri}$ of the transformer T1 is not high enough.

During each switching cycle of the power converter 100, the average input current $I_{in\_avg}$ of the power converter 100 under peak current control mode can be derived from equation 1:

$$I_{in\_avg} = \frac{1}{2} \cdot I_{pri\_pk} \cdot \frac{T_{on}}{T_P} \tag{1}$$

where $$I_{pri\_pk} = \frac{D_{ISENSE}}{R_{SNS}}$$

Figure 3:
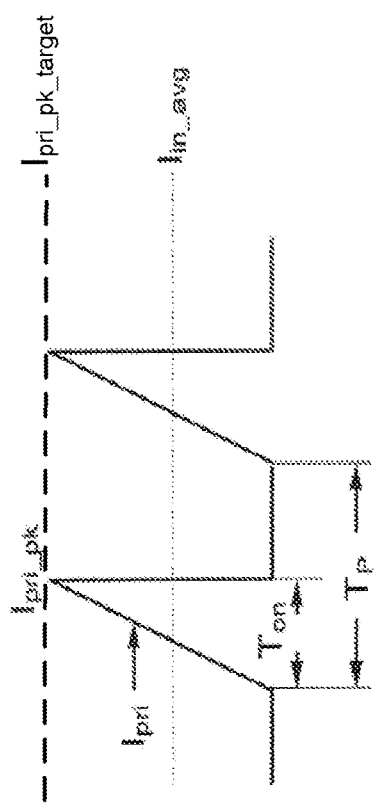
FIG. 3 is a waveform of the primary side current of the switching power converter.

FIG. 3 is a waveform diagram of the primary side current $I_{pri}$ illustrating the variables used by the controller 105 to calculate the average input current $I_{in\_avg}$ in equation 1. As shown in FIG. 3, the on-time $T_{on}$ included in equation 1 represents the duration of time that the switch Q1 is turned on during a switching cycle of the power converter 100. Furthermore, the switching period $T_P$ included in equation 1 represents the switching period $T_P$ of the power converter 100 and $I_{pri\_pk}$ represents the peak primary side current through the switch Q1 during the switching cycle.

The controller 105 estimates the average input current of the power converter 100 by substituting $$\frac{D_{ISENSE}}{R_{SNS}}$$

for $I_{pri\_pk}$ resulting in equation 2:

$$I_{in\_avg} = \frac{1}{2} \cdot \frac{D_{ISENSE}}{R_{SNS}} \cdot \frac{T_{on}}{T_P} \tag{2}$$

The values of $D_{ISENSE}$, $T_{on}$, and $T_P$ can be directly measured or calculated by the controller 105 to control the operation of the power converter 100. However, the impedance (e.g., resistance) of the sense resistor $R_{SNS}$ of the power converter 100 is initially unknown to the controller 105 and must be determined by the controller 105. The impedance of the sense resistor $R_{SNS}$ may be selected by a designer of the power converter 100 when designing the power converter 100, but the controller 105 is designed such that the impedance of the sense resistor $R_{SNS}$ is initially unknown to the controller 105.

In one embodiment, the sense configuration resistor $R_{SNS\_CFG}$ is utilized by the controller 105 to measure the impedance of the sense resistor $R_{SNS}$. The designer of the power converter 100 adds the sense configuration resistor $R_{SNS\_CFG}$ to the design of the power converter 100 in order for the controller 105 to measure the impedance of the sense resistor $R_{SNS}$ that is unknown to the controller 105. In one embodiment, the impedance of the sense configuration resistor $R_{SNS\_CFG}$ and the impedance of the sense resistor $R_{SNS}$ is selected by the designer of the power converter 100 according to equation 3:

$$R_{SNS\_CFG} = K \cdot R_{SNS} \quad (3)$$

where K>>1

By having the designer of the power converter 100 select the impedance of the sense configuration resistor $R_{SNS\_CFG}$ according to the relationship described in equation 3, the controller 105 can determine the impedance of the sense resistor $R_{SNS}$ of the power converter 100 during a measurement mode as will be further described below. As shown in equation 3, the impedance of the sense configuration resistor $R_{SNS\_CFG}$ is proportional to the impedance of the sense resistor $R_{SNS}$. In one embodiment, K represents a scaling factor that is a constant value directly programmed into the controller 105. For example, K may be equal to 400. Thus, the impedance of the sense resistor $R_{SNS}$ may be 400 times greater than the impedance of the sense configuration resistor $R_{SNS\_CFG}$. For example, if the impedance of the sense resistor $R_{SNS}$ is 10Ω, the impedance of the sense configuration resistor $R_{SNS\_CFG}$ is 4 kΩ.

Sense Resistor $R_{SNS}$ Measurement

Figure 4:
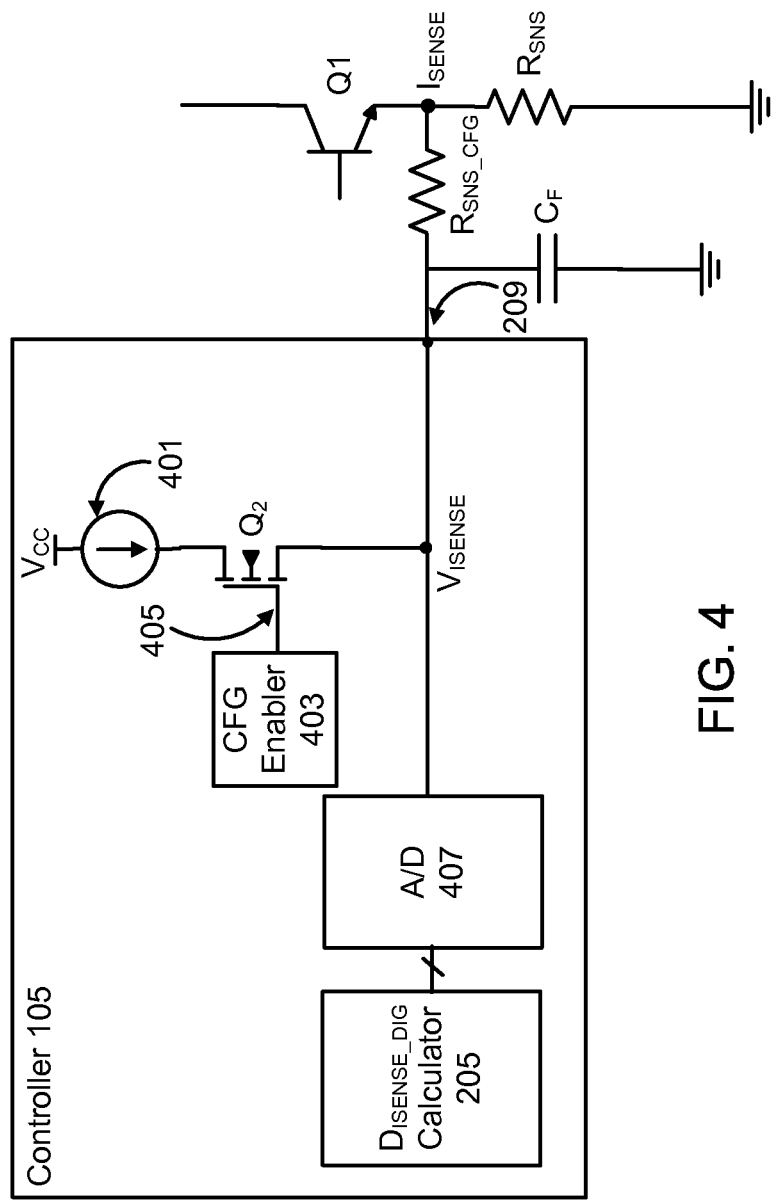
FIG. 4 is a circuit diagram of an exemplary measurement circuit for determining an impedance of a sense resistor of the switching power converter according to one embodiment.

FIG. 4 is a configuration of the controller 105 in a measurement mode for measuring (i.e., determining) the impedance of the sense resistor $R_{SNS}$ according to one embodiment. The controller 105 includes components similar those described with respect to FIG. 2 such as $D_{ISENSE\_DIG}$ calculator 205. Thus, the description for the similar components is omitted.

As shown in FIG. 4, to measure the impedance of the sense resistor $R_{SNS}$, a constant current source 401 is connected to the $I_{SENSE}$ pin 209 of the controller 105 via a switch Q2. In the embodiment shown in FIG. 4, the switch Q2 is a p-channel MOSFET. As shown in FIG. 4, a first end of the switch Q2 (e.g., the source terminal) is coupled to the constant current source 401 and the second end of the switch Q2 (e.g., the drain terminal) is coupled to the $I_{SENSE}$ pin 209 of the controller 105. In one embodiment, the constant current source 401 supplies 500 μA of current to the switch Q2.

A configuration enabler 403 is coupled to a third end of the switch Q2 (e.g., the gate terminal). The configuration enabler 403 generates a drive signal 405 that turns on switch Q2 during the measurement mode of the sense resistor $R_{SNS}$. When the switch Q2 is turned on in response to the drive signal 405, current supplied by the current source 401 flows through the switch Q2 out of the controller 105 via the $I_{SENSE}$ pin 209 to ground via a path including the sense configuration resistor $R_{SNS\_CFG}$ followed by the sense resistor $R_{SNS}$. In one embodiment, the controller 105 measures the voltage drop $V_{ISENSE}$ on the $I_{SENSE}$ pin 209 when the 500 μA of current is supplied according to equation 4:

$$V_{ISENSE} = 500 \mu A \cdot (R_{SNS\_CFG} + R_{SNS}) = 500 \mu A \cdot (K+1) \cdot R_{SNS} \quad (4)$$

The voltage $V_{ISENSE}$ is received by the A/D converter 407. The A/D converter 407 converts the analog voltage to a digital representation of $V_{ISENSE}$. The digital representation of $V_{ISENSE}$ is sent to the $D_{ISENSE\_DIG}$ calculator 205. The controller 105 can estimate the impedance of the sense resistor $R_{SNS}$ based on the relation obtained by manipulating equation 4 into equation 5:

$$R_{SNS} = \frac{V_{ISENSE}}{500 \mu A \cdot (K+1)} \quad (5)$$

Since $V_{ISENSE}$ can be measured by the controller 105, the controller 105 can measure the value of the sense resistor $R_{SNS}$ according to equation 5. With the measured value of the sense resistor $R_{SNS}$, the controller 105 can estimate the average input current of the power converter 100 based on equation 2 previously described above.

In one embodiment, the controller 105 uses the input current estimation and the peak current regulation method described above with respect to FIG. 2 to regulate the average input current $I_{in\_avg}$ to follow a reference input current $I_{in\_ref}$. As shown in FIG. 3, the average input current $I_{in\_avg}$ is substantially equivalent to the reference input current $I_{in\_ref}$.

Using equation 2, the average input current of the power converter in the $n^{th}$ switching cycle is based on equation 6:

$$I_{in\_avg} = \frac{1}{2} \cdot \frac{D_{ISENSE}(n)}{R_{SNS}} \cdot \frac{T_{on}(n)}{T_P(n)} \quad (6)$$

In one embodiment, the reference regulation voltage $D_{ISENSE}$ for the $n^{th}$ switching cycle is set by a designer of the controller 105 according to equation 7:

$$D_{ISENSE}(n) = 2 \cdot R_{SNS} \cdot I_{in\_ref}(n) \cdot \frac{T_P(n-1)}{T_{on}(n-1)} \quad (7)$$

where $T_{on}(n-1)$ and $T_P(n-1)$ are the measured on-time and switching period in the $(n-1)^{th}$ switching cycle.

Substituting equation 7 into equation 6 results in equation 8:

$$I_{in\_avg} = \frac{1}{2} \cdot \frac{D_{ISENSE}(n)}{R_{SNS}} \cdot \frac{T_{on}(n)}{T_P(n)} = I_{in\_ref}(n) \cdot \frac{T_P(n-1)}{T_{on}(n-1)} \cdot \frac{T_{on}(n)}{T_P(n)} \quad (8)$$

Assuming that the switching frequency is high (e.g., 20 kHz to 90 kHz), the on-time and the switching period of two consecutive switching cycles is substantially equivalent. Accordingly, the average input current $I_{in\_avg}(n)$ is substantially equivalent to the input reference current $I_{in\_ref}(n)$ i.e., $I_{in\_avg}(n) \approx I_{in\_ref}(n)$ assuming that $I_{ISENSE}(n)$ is set according to equation 7 and the switching frequency of the power converter 100 is much greater than the line frequency (e.g., 50-60 Hz). Thus, the average input current $I_{in\_avg}$ follows the reference current $I_{in\_ref}$ under the reference voltage regulation method implemented by controller 105.

Upon reading this disclosure, those of skill in the art will appreciate still additional alternative designs for estimating input current indirectly from the primary regulation current of switching power converters. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
   a magnetic component coupled to an input voltage and an output of the switching power converter;
   a switch coupled to the magnetic component to control current through at least part of the magnetic component, current through at least the part of the magnetic component generated while the switch is turned on and not being generated while the switch is turned off;
   a controller including a pin for sensing the current through at least the part of the magnetic component, the controller configured to generate a control signal to turn on or turn off the switch during a plurality of switching cycles of the switch;
   a resistive voltage divider including a first resistor and a second resistor, the current through at least the part of the magnetic component flows through the first resistor but not through the second resistor; and
   wherein the controller is configured to estimate an average input current of the switching power converter based on the following equation:

$$I_{in\_avg} = \frac{1}{2} \cdot \frac{D_{ISENSE}}{R_{SNS}} \cdot \frac{T_{on}}{T_P}$$

where $I_{in\_avg}$ is the estimated average input current, $D_{ISENSE}$ is a value representing a target peak current through at least the part of the magnetic component, $R_{SNS}$ is an impedance of the first resistor, $T_{on}$ is an on-time of the switch during a switching cycle of the power converter, and $T_p$ is a period of the switching cycle.

2. The switching power converter of claim 1, wherein the controller is further configured to regulate the estimated average input current of the switching power converter to follow a reference current.

3. The switching power converter of claim 1, wherein an impedance of the second resistor is proportional to the impendence of the first resistor by a scaling factor.

4. The switching power converter of claim 1, wherein the controller is configured to supply a current via a path including the second resistor followed by the first resistor during a measurement mode of the controller to determine the impedance of the first resistor based on a voltage measured across the resistive voltage divider, the supplied current, and a relationship between the impedance of the first resistor and an impedance of the second resistor.

5. In a controller, a method of controlling a switching power converter, the switching power converter including a magnetic component coupled to an input voltage and an output of the switching power converter and a switch coupled to the magnetic component to control current through at least a part of the magnetic component, current through at least the part of the magnetic component being generated while the switch is turned on and not being generated while the switch is turned off, the switching power converter further including a resistive voltage divider including a first resistor and a second resistor, the current through at least the part of the magnetic component flows through the first resistor but not through the second resistor, the method comprising:
   generating a control signal to turn on or turn off the switch during a plurality of switching cycles of the switch; and
   estimating an average input current of the switching power converter based on the following equation:

$$I_{in\_avg} = \frac{1}{2} \cdot \frac{D_{ISENSE}}{R_{SNS}} \cdot \frac{T_{on}}{T_P}$$

where $I_{in\_avg}$ is the estimated average input current, $D_{ISENSE}$ is a value representing a target peak current through at least the part of the magnetic component, $R_{SNS}$ is an impedance of the first resistor, $T_{on}$ is an on-time of the switch during a switching cycle of the power converter, and $T_p$ is a period of the switching cycle.

6. The method of claim 5, further comprising:
   regulating the estimated average input current of the switching power converter to follow a reference current.

7. The method of claim 5, further comprising:
   supplying a current via a path including the second resistor followed by the first resistor during a measurement mode of the controller;
   determining the impedance of the first resistor based on a voltage measured across the resistive voltage divider, the supplied current, and a relationship between the impedance of the first resistor and an impedance of the second resistor.

8. A switching power converter comprising:
   a magnetic component coupled to an input voltage and an output of the switching power converter;
   a switch coupled to the magnetic component to control current through at least part of the magnetic component, current through at least the part of the magnetic component generated while the switch is turned on and not being generated while the switch is turned off;
   a controller including a pin for sensing the current through at least the part of the magnetic component, the controller configured to generate a control signal to turn on or turn off the switch during a plurality of switching cycles of the switch;
   a resistive voltage divider including a first resistor and a second resistor, the current through at least the part of the magnetic component flows through the first resistor but not through the second resistor;
   wherein the controller is configured to supply a current via a path including the second resistor followed by the first resistor during a measurement mode of the controller to determine an impedance of the first resistor based on a voltage measured across the resistive voltage divider, the supplied current, and a relationship between the impedance of the first resistor and an impedance of the second resistor; and
   wherein the controller is configured to estimate an average input current of the switching power converter based on a value representing a target peak current through at least the part of the magnetic component and the determined impedance of the first resistor.

9. The switching power converter of claim 8, wherein the controller is further configured to regulate the estimated average input current of the switching power converter to follow a reference current.

10. The switching power converter of claim 8, wherein the impedance of the second resistor is proportional to the impendence of the first resistor by a scaling factor.

11. In a controller, a method of controlling a switching power converter, the switching power converter including a magnetic component coupled to an input voltage and an output of the switching power converter and a switch coupled to the magnetic component to control current through at least a part of the magnetic component, current through at least the part of the magnetic component being generated while the switch is turned on and not being generated while the switch is turned off, the switching power converter further including a resistive voltage divider including a first resistor and a second resistor, the current through at least the part of the magnetic component flows through the first resistor but not through the second resistor, the method comprising:

generating a control signal to turn on or turn off the switch during a plurality of switching cycles of the switch;

supplying a current via a path including the second resistor followed by the first resistor during a measurement mode of the controller;

determining an impedance of the first resistor based on a voltage measured across the resistive voltage divider, the supplied current, and a relationship between the impedance of the first resistor and an impedance of the second resistor; and estimating an average input current of the switching power converter based on a value representing a target peak current through at least the part of the magnetic component and the determined impedance of the first resistor.

12. The method of claim 11, further comprising:

regulating the estimated average input current of the switching power converter to follow a reference current.

13. The method of claim 11, wherein the impedance of the second resistor is proportional to the impendence of the first resistor by a scaling factor.

\* \* \* \* \*